(No Model.)
L. LANDRETH.
VEHICLE.
No. 494,008. Patented Mar. 21, 1893.
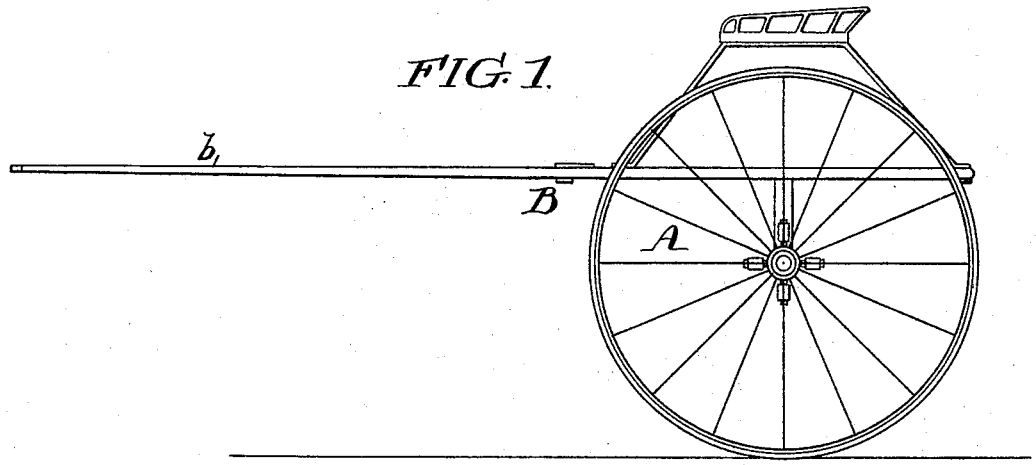
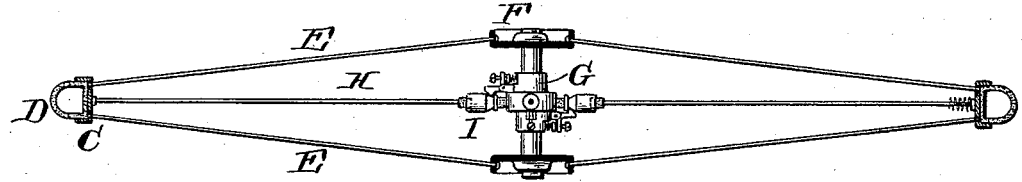
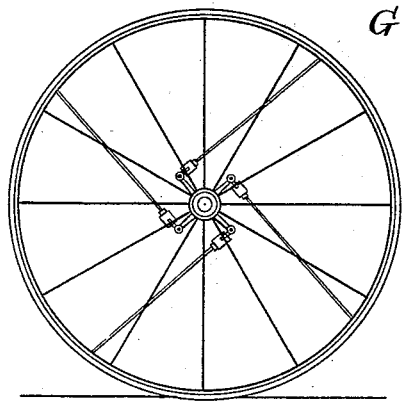
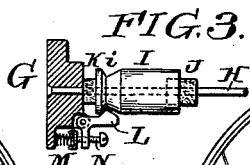
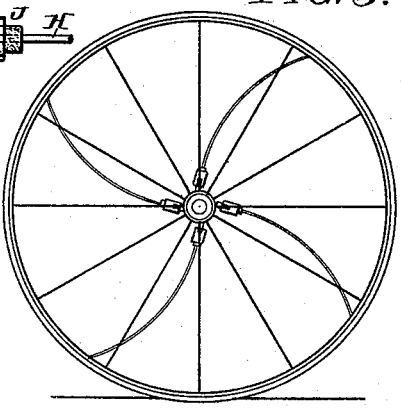
WITNESSES:
INVENTOR:
Leopold Landreth
By his atty

UNITED STATES PATENT OFFICE.

LEOPOLD LANDRETH, OF BRISTOL, PENNSYLVANIA.

VEHICLE.

SPECIFICATION forming part of Letters Patent No. 494,008, dated March 21, 1893.

Application filed December 29, 1892. Serial No. 456,643. (No model.)

*To all whom it may concern:*

Be it known that I, LEOPOLD LANDRETH, of Bristol, Bucks county, State of Pennsylvania, have invented an Improvement in Vehicles, of which the following is a specification.

My invention has reference to vehicles, and consists of certain improvements which are fully set forth in the following specification, and shown in the accompanying drawings which form a part thereof.

The object of my invention is to provide the wheels of any vehicles adapted to be propelled over the ground such as sulkies, bicycles, &c., with suitable devices for varying the centrifugal action of said wheels; that is to say, to so construct them that when going at slow speeds or when starting the peripheries of the wheels shall have less weight than when the vehicle is under full headway. In sulkies and those classes of vehicles adapted to speeding it is desirable that the wheels shall have as little weight as possible at their peripheries so as to be easily started, and after obtaining a desired velocity, it is desirable that the wheels near the tires shall have more weight thrown into them to steady the vehicle and assist the horse or other source of propulsion by providing a positive centrifugal action which will materially help by imparting steadiness as well as a greater momentum to the traveling vehicle.

Referring to the drawings: Figure 1 is a side elevation of a sulky or road cart embodying my invention, and is given as one type of a vehicle. Fig. 2 is a sectional plan view of a wheel provided with my improvements applied thereto. Fig. 3 is an enlarged view of a portion of Fig. 2. Figs. 4 and 5 are side elevations of wheels showing modifications of my invention, and Fig. 6 is an end elevation of a modified form of wheel embodying my invention.

While I have shown my invention as applied to a sulky it is to be understood that it is applicable to all classes of vehicles which are to be propelled or moved over the ground, and which are required to move from a condition of rest to one of great velocity.

A are the wheels of the vehicle, and B is the frame work.

The general construction of the parts A and B may be of any suitable kind. The shafts $b$ of the sulky may be connected with the wheels in any well known manner, as this part is immaterial to my invention. The wheel A is preferably formed with a sheet metal rim C supporting a pneumatic tire D and connected with a hub F by inclined spoke wires E, forming for instance what are commonly known as bicycle wheels. Surrounding the hub is a band G to which is connected the inner end of the guide wires H, the outer ends of which are secured to the rim or felly C. There may be any number of these radial wires H desired, and they are preferably arranged within the space bounded by the spoke wires E so as to be fully protected. Sliding upon these wires H are weights I which are preferably provided with a rubber cushion J secured to the outer ends. The weights rest upon rubber cushions K adjacent to the hubs and are provided with notches or annular grooves $i$ of suitable shape in which the pawl L works to hold the weights adjacent to the hubs until a given speed is obtained. The pawl is pivoted to the band G and is provided with an adjusting screw N which presses upon a tension spring M so as to apply any pressure to the spring notch L desired. It will now be seen that when the weight is attached to the center of the wheel as indicated in Figs. 2 and 3, that it will be maintained in that position until the speed of the wheel is so great that the centrifugal action will cause the tendency of the weights I to fly outward upon their guides H to become greater than the tendency of the pawl L to hold them in place, and then the said weights will move to the periphery of the wheel and remain there under the action of centrifugal force. Thus it will be seen that the small weights which were originally arranged close to the hub and did not materially affect the starting of the vehicle or the increase of its speed, are ultimately projected to the periphery so as to materially increase the momentum of the wheel by the addition of the increased weight, thereby acting to steady the wheel and assist the horse or propelling power. By an examination of Fig. 3 it will be observed that the pawl L is made V shaped in both directions so as to permit the ready movement of the weight I in either direction. When the vehicle slows down, the weights may drop by gravity, and by their own action may automatically reset themselves, though it is not essential that they be so constructed.

In Fig. 4 the guides H are shown as extending rearward of a radial line through the hub to assist the weights I in passing from the hub to the periphery. In Fig. 5 these guides H are shown as curved in place of being straight, as shown in Fig. 4, to more nearly correspond to the mathematical movement of the weights in passing from the hub to the periphery. It is immaterial how these guide wires may be arranged, or what alignment they may have provided they extend from the hub to the periphery or to a distance from the hub.

In the construction shown in Fig. 6, we have an ordinary wooden wheel with the guide wires H arranged upon one side of the wheel and just to one side of the spoke.

I do not limit myself to any detail of construction as to the kind of weights, notches, or guides employed, as my invention comprehends the combination with the wheel of the vehicle and said features when made in any suitable construction adapted to the accomplishment of the results of the invention.

What I claim as new, and desire to secure by Letters Patent, is—

1. A vehicle provided with one or more wheels having guides extending from the hubs outward, in combination with movable weights supported upon said guides, and catches adapted to hold the weights adjacent to the hub until centrifugal action is increased sufficiently to overcome the catches and liberate the weights.

2. A vehicle provided with one or more wheels having guides extending from the hubs outward and secured to the tire of the wheel and intermediate of the spokes, in combination with movable weights supported upon said guides, and catches adapted to hold the weights adjacent to the hub until centrifugal action is increased sufficiently to overcome the catches and liberate the weights.

3. A vehicle provided with one or more wheels having guides extending from the hub outward, in combination with movable weights supported upon said guides, and spring catches adapted to hold the weights adjacent to the hub until centrifugal action is increased sufficiently to overcome the catches and liberate the weights.

4. A vehicle having one or more of its wheels provided with guides extending from the hub toward the tire, weights supported upon said guides, a spring to receive the thrust of the weight when in its outward position, and a suitable catch to hold the weight adjacent to the hub of the wheel until a predetermined centrifugal action is obtained.

5. A vehicle having one or more wheels formed with a pneumatic tire and oblique spokes leading from the hub, two or more stretched wire guides between the hub and the rim of the wheel, weights guided upon said stretched wires, and automatic catches adapted to hold the weights adjacent to the hub until a given speed has been obtained.

6. A vehicle having one or more wheels formed with a pneumatic tire and oblique spokes leading from the hub, two or more stretched wire guides between the hub and the rim of the wheel, weights having springs guided upon said stretched wires, and automatic catches adapted to hold the weights adjacent to the hub until a given speed has been obtained.

7. A vehicle having one or more wheels formed with a pneumatic tire and oblique spokes leading from the hub, two or more stretched wire guides between the hub and the rim of the wheel, weights guided upon said stretched wires and having notches, and automatic catches consisting of a spring catch part having an oblique retaining portion projecting into the notch of the weight and adapted to hold the weights adjacent to the hub until a given speed has been obtained.

8. A vehicle having one or more of its wheels provided with guides extending from or near the hub outward toward the tire and in which the said guides meet the tire at a suitable distance to the rear of a radial line through their connection with the hub, weights supported by said guides and free to move thereon, and automatic catches to liberate said weights under the action of centrifugal force.

In testimony of which invention I have hereunto set my hand.

LEOPOLD LANDRETH.

Witnesses:
R. M. HUNTER,
H. L. MOTHERWELL.